(12) United States Patent
Lerenc et al.

(10) Patent No.: US 6,892,219 B1
(45) Date of Patent: May 10, 2005

(54) SYSTEM AND METHOD FOR ASCERTAINING AN DISPLAYING CONNECTION-RELATED PERFORMANCE DATA IN NETWORKS

(75) Inventors: Vedran Lerenc, Waghausel (DE); Jochen Sandvoss, Mannheim (DE)

(73) Assignee: International Business Machines Corporation, Armonk, NY (US)

(*) Notice: Subject to any disclaimer, the term of this patent is extended or adjusted under 35 U.S.C. 154(b) by 813 days.

(21) Appl. No.: 09/240,118

(22) Filed: Jan. 29, 1999

(30) Foreign Application Priority Data

Mar. 30, 1998 (DE) ........................................ 198 13 884

(51) Int. Cl.[7] .............................................. G06F 15/16
(52) U.S. Cl. ....................... 709/203; 709/217; 709/219
(58) Field of Search .......................... 709/203, 217–219, 709/224, 247; 345/327; 434/62; 710/29; 213/201

(56) References Cited

U.S. PATENT DOCUMENTS

| | | | | |
|---|---|---|---|---|
| 5,919,045 A | * | 7/1999 | Tagge et al. .................. | 434/62 |
| 5,978,841 A | * | 11/1999 | Berger ......................... | 709/217 |
| 6,006,260 A | * | 12/1999 | Barrick, Jr. et al. ......... | 709/224 |
| 6,025,837 A | * | 2/2000 | Matthews, III et al. ..... | 345/327 |
| 6,094,677 A | * | 7/2000 | Capek et al. ................ | 709/219 |
| 6,185,625 B1 | * | 2/2001 | Tso et al. .................... | 709/247 |
| 6,185,689 B1 | * | 2/2001 | Todd, Sr. et al. ........... | 713/201 |
| 6,205,498 B1 | * | 3/2001 | Habusha et al. .............. | 710/29 |

* cited by examiner

*Primary Examiner*—Frantz B. Jean
(74) *Attorney, Agent, or Firm*—A. Bruce Clay; Yee & Associates, P.C.

(57) ABSTRACT

The present invention describes a system and method for ascertaining and displaying connection-related performance data. Performance data in networks, in particular in the application area of WWW applications, such as web browsers, for example, is ascertained and displayed. The technical feasibility of expanding HTML documents retrospectively to include performance data, such as loading speed or time, is integrated into the layout of the referenced document. The performance data can be expanded in a proxy, which adds a loading speed or time to be expected to the document to be forwarded.

21 Claims, 5 Drawing Sheets

SYSTEM AND METHOD FOR ASCERTAINING AN DISPLAYING CONNECTION-RELATED PERFORMANCE DATA IN NETWORKS

FIELD OF THE INVENTION

The present invention relates in general to computer software, and in particular to a system and method for ascertaining and displaying connection-related performance data in networks when loading documents from the internet.

BACKGROUND OF THE INVENTION

Users of the World Wide Web (WWW) access the document stock of the internet via web browsers. Both the connection set-up to a certain server and the transmission of the web page can take up some time. This is the case above all if the user wishes to download selected documents onto his system. The user does not receive any information whatsoever regarding the waiting time to be expected when accessing a certain document; important information, to be precise, the connection and transmission speed, is not displayed.

This lack of information hampers productivity if users are seeking information on the internet or want to load fairly large packets of information from the internet and several selection options exit. When searching, the user often finds himself in the situation of a wealth of possible search successes. However few of those documents are really relevant and do not just touch on the subject area. The user is slowed down in this process by web servers which are all too slow and often do not hold the desired information. A similar problem arises when requesting fairly large information packets. The user only recognizes which hyperlinks (links in documents of the WWW) are fast, i.e. have a high transmission speed, and which do not, after a fairly long period. In the case of slow connections, these are often aborted if possible and a new attempt made on a different web server. Some web servers try to help users with this problem by means of additional information on their web pages. FIG. 1 shows the download page of shareware.com. On this page, an icon is placed ahead of each hyperlink which is intended to indicate how reliable the corresponding web server is. However, this information is at best a guide, is scarcely attended to and does not go into one important variable in dealing with the WWW, to be precise, the duration of the transmission. The duration of the transmission depends on the network topology and the link of the client system to the network. Fluctuations in the traffic volume in the network also result in completely different transmission times.

An object of the present is, therefore, to provide a system and method which provides the user, prior to the loading of referenced documents, with transmission information for the loading of these documents. This method is simple in construction and mode of operation and is capable of implementation without significant modification of the existing hardware and software.

The present invention represents a solution to the problem of performance quality information not being available in the application environment of WWW applications, such as web browsers. It is based on the technical feasibility of expanding HTML documents belatedly to include performance information. The information expansion can be effected in a proxy, which adds a loading speed or time to be expected to the documents to be passed on. However, functionality of this kind does not have to remain limited to this form of realization. Any addition of performance information (e.g. web browser) to an HTML document fulfils the fundamental idea of the present invention.

BRIEF DESCRIPTION OF THE DRAWINGS

The present invention is explained in greater detail with reference to preferred practical examples and to the attached Drawings, in which.

DETAILED DESCRIPTION OF THE INVENTION

The present invention describes the expansion of WWW-documents to include performance data of a connection. The performance information is integrated directly into the document and can indicate either the loading speeds or times to be expected. The performance information is preferably specified directly in connection with the hyperlink referring to a further document. The performance information is made visible to the user by means of a conventional web browser and thereby facilitates efficient working in the WWW. A particular form of performance of the present invention consists in the invention being executed within a proxy, which inserts the performance data of the connections into the documents to be passed on. The combination with a proxy yields a further advantage in that the proxy can store the documents temporarily in the cache and in doing this insert the performance data into the documents.

Figure 1:
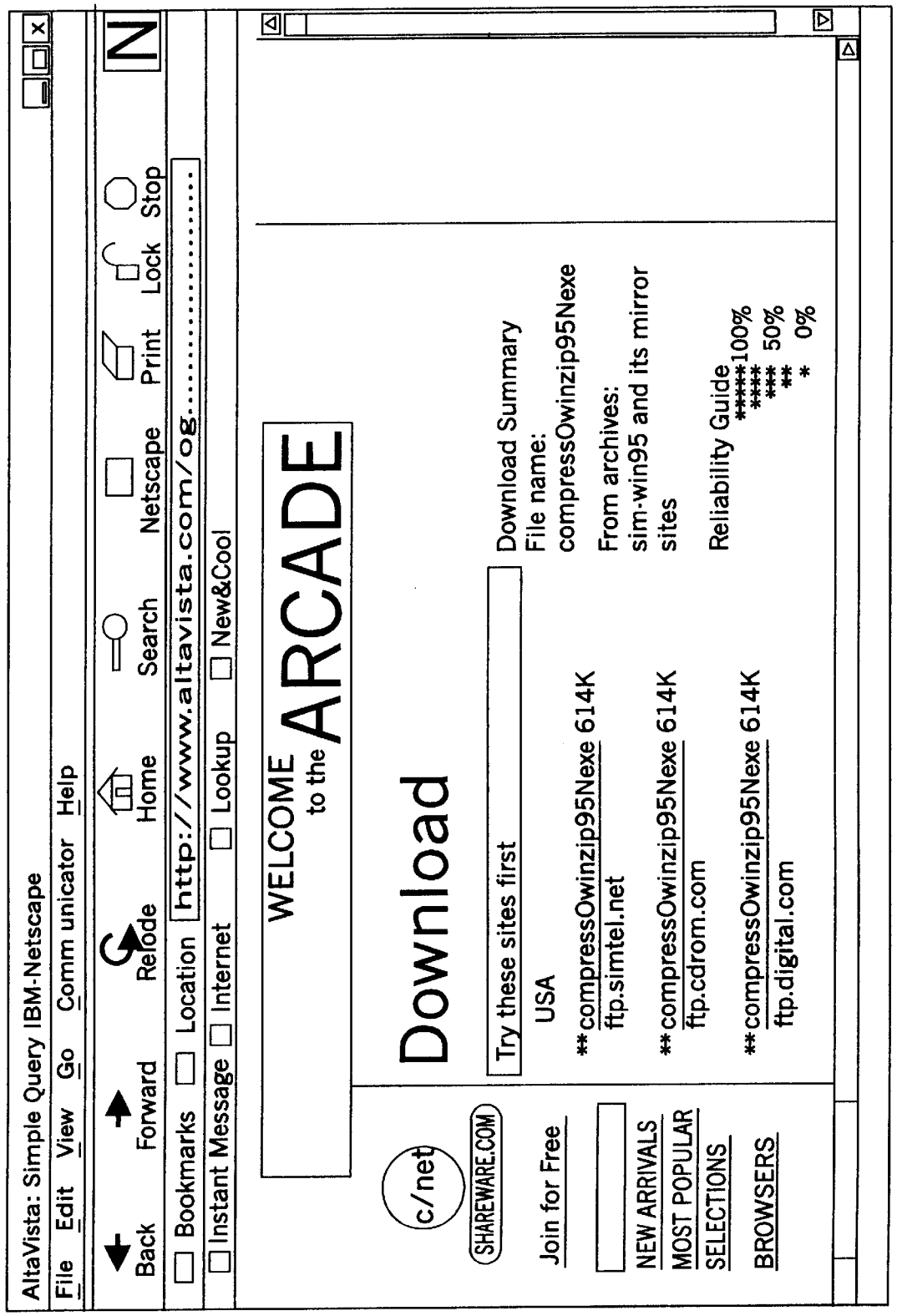
FIG. 1 shows the prior art taking the download page of shareware.com. as an example.
Figure 2:
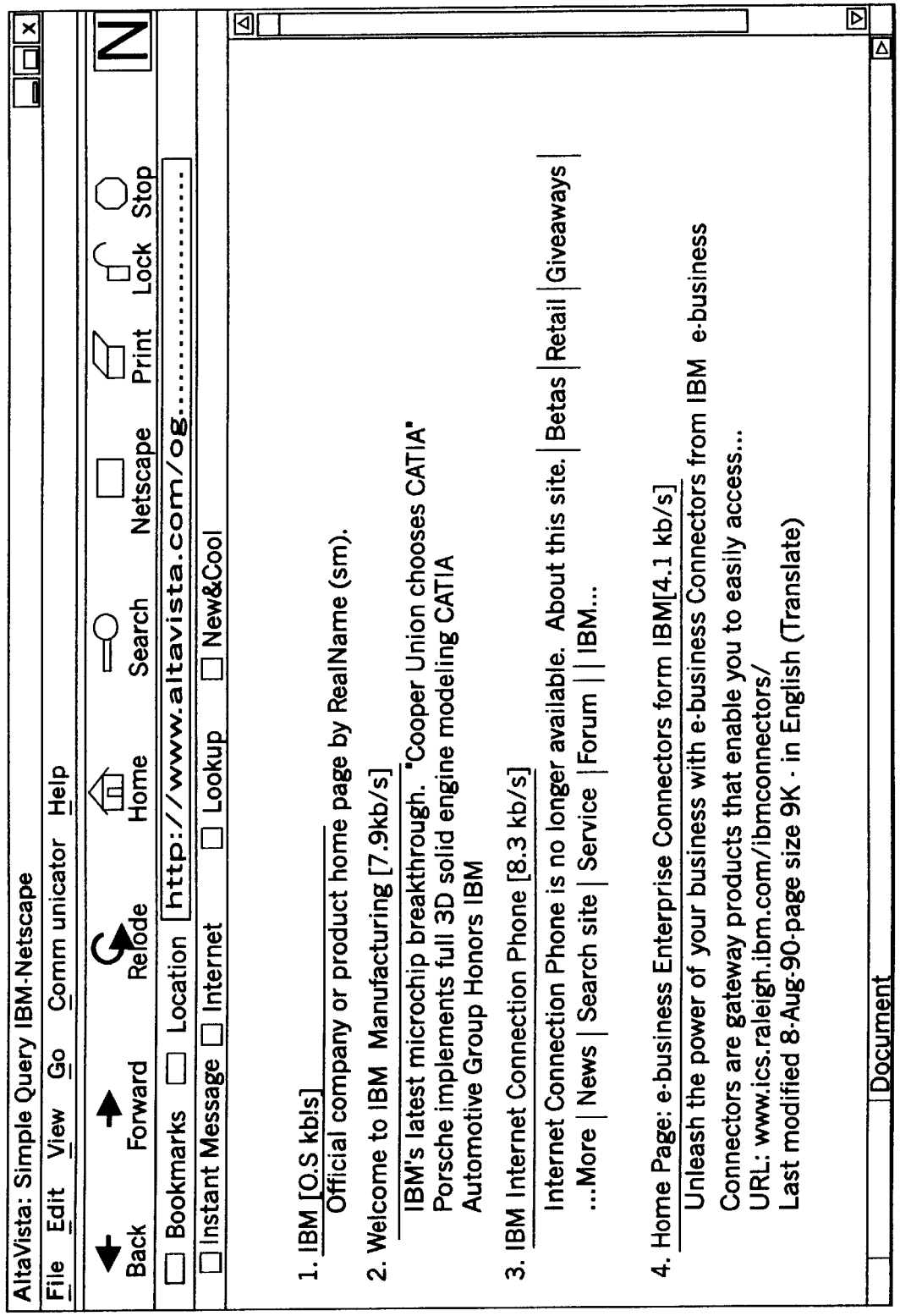
FIG. 2 shows the implementation of a practical example of the present invention taking an internet web page as an example.

In this process the proxy will search through the documents to be passed on, which contain files of a defined format, for references (hyperlinks) to other documents or files and add connection-related performance data to these. FIG. 2 shows the visual realization of the present invention taking a web page as an example. The web page shows the result of a search for the term "IBM". The search engine has found 1749490 documents containing the term "IBM". The corresponding transmission speed for the document in question is quoted for each document. For example, the document "IBM Global Network—Brazil" has the performance information 0.8 kilobytes per second, i.e. the document is transmitted at a transmission speed of 0.8 kilobytes per second.

The performance data can be implemented in the document, for example, by an algorithm for integration of the relevant performance information searching for hyper-link tags in the document in order to expand these to include the performance details (e.g. transmission speed or transmission time). When the pointer is placed on a hyperlink, the performance details become visible. A hyperlink tag is a marking from which the browser recognizes that the referenced text or the following image refers to another document. The following example should make this clear:

Example: Reference to the homepage of IBM is replaced by a modified reference with performance details.
Original hyperlink:<a href="http://www.ibm.com">Homepage of IBM</a>
Modified hyperlink with performance details:<a href="http://www.ibm.com">Homepage of IBM [16.3 kb/s]</a>

Here the hyperlink or ANCHOR tag of the language HTML is recognizable (<a . . . > and </a>). The text between the starting element (<a . . . >) and the closing element (</a>) is normally indicated as a hyperlink in the browser by a different color. In the modified version, the transmission speed to be expected has been added to the hyperlink and is thus clearly related to the hyperlink for the user.

Alternatively, a loading time could also be displayed. This is demonstrated in the following example on the reference used above:

Modified hyperlink:<a href="http://www.ibm.com">Homepage of IBM [3.4 sec]</a>

Figure 3:
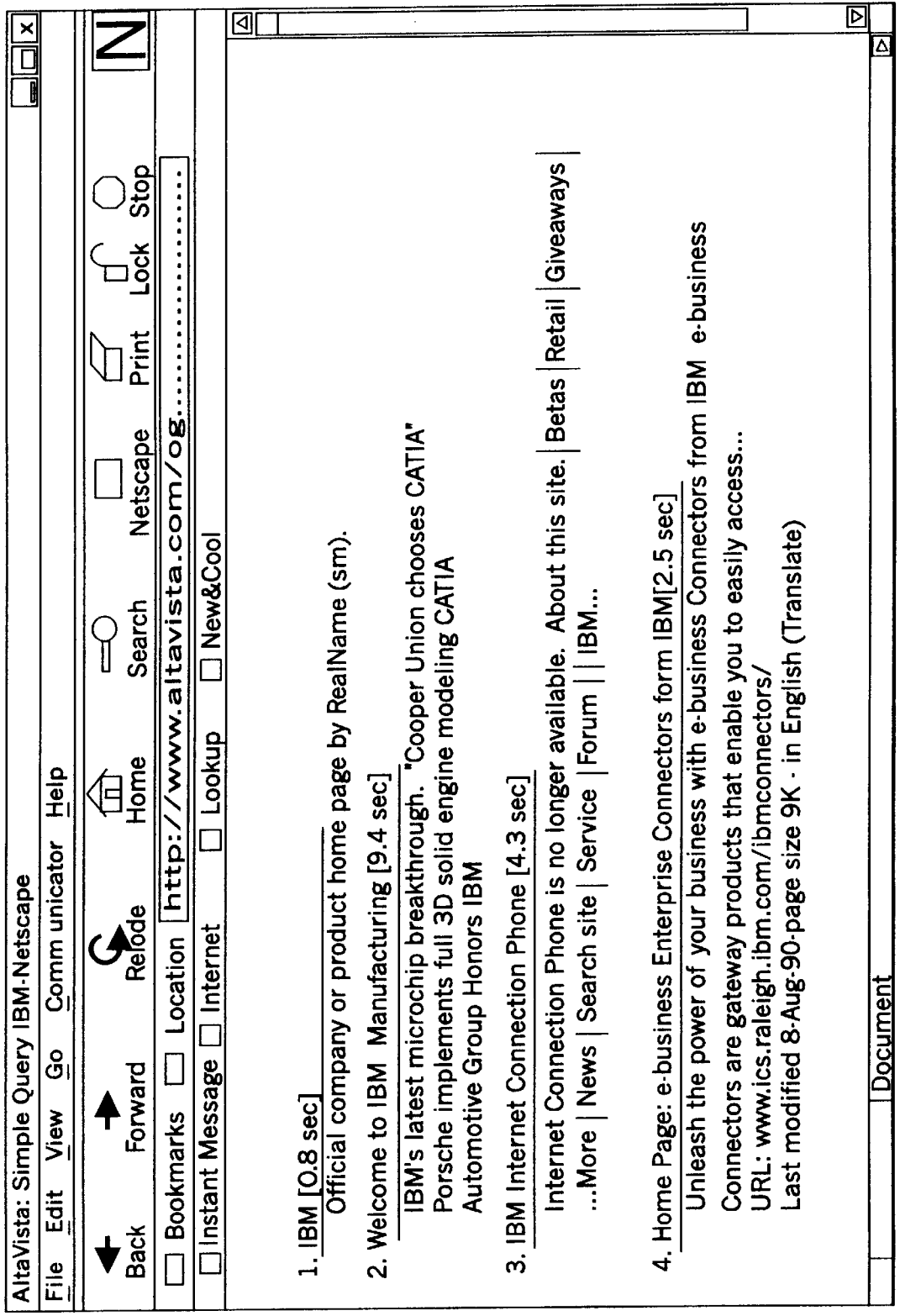
FIG. 3 shows the implementation of a further practical example of the present invention taking an internet web page as an example.

This form of performance has the disadvantage in that the size of the document would have to be requested from the server in order to calculate the corresponding loading time. However, this can be done via an HTTP-HEAD request, which only supplies document information in return and not the document itself. In this case, HTTP (Hypertext Transfer Protocol) is the standard protocol for WWW applications on the internet. FIG. 3 shows a further form of performance of the visual representation of the present invention. Here the transmission time is added to the document instead of the transmission speed.

To be able to specify the transmission speeds to be expected, they must be ascertained. In addition to the option already cited of determining these through HTTP-HEAD requests, it is also possible for a proxy, for example, to manage lists with web server performance profiles, which it can fill with performance data obtained in operation. These lists can contain several entries for each web server addressed. (the number would depend on the accuracy required), which could record the latest average transmission time within a defined time interval. These data could then be integrated by the proxy into the documents in the manner described above.

As well as the possibility of integrating the present invention via a proxy, it is also feasible for browser manufacturers to integrate the present invention directly into their browsers. The round-trip time to the web server could be determined via a short enquiry similar to a ping and the loading speed to be expected thus ascertained. This could be integrated into the layout of the document and made visible to the user. If the enquiry were to consist of a HTTP-HEAD request, the loading time could also be displayed to the user.

Figure 4:
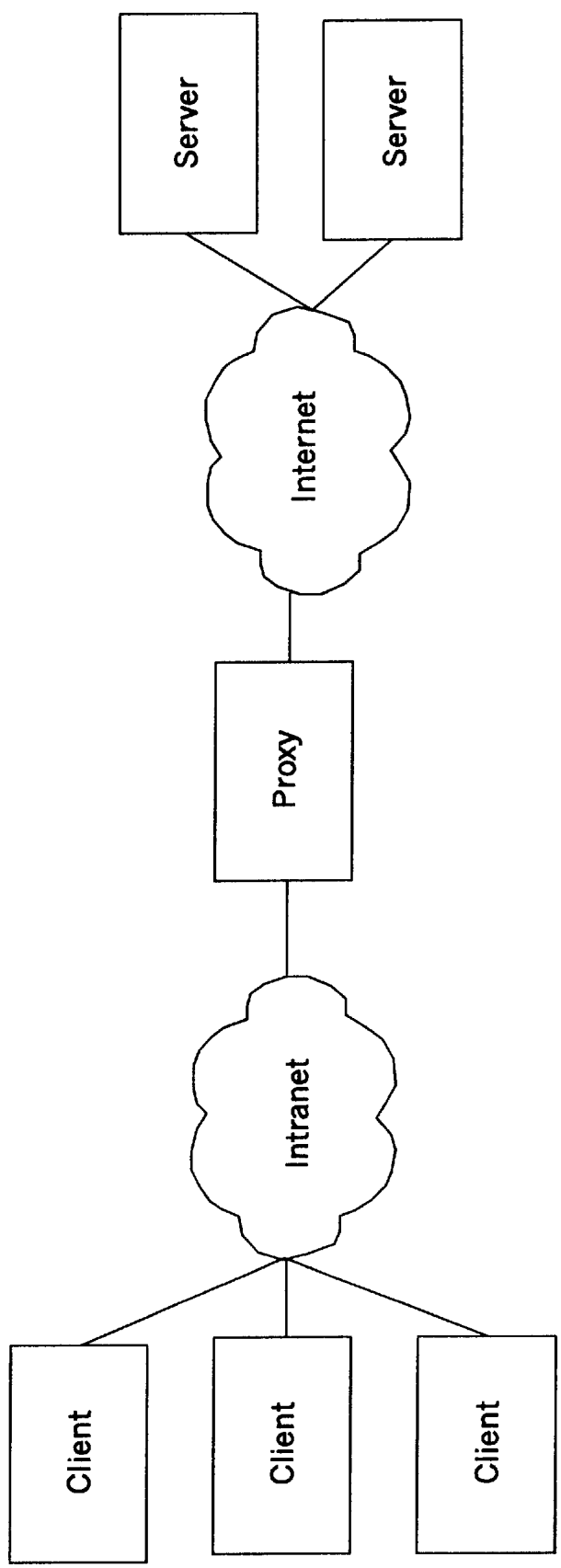
FIG. 4 shows a communications architecture between a client system and a server system connected to one another via intranet and internet in which the present invention can be used.

FIG. 4 describes a communications architecture in which the present invention can be implemented, comprising one or more clients connected to the internet via a special proxy. The proxy is a service representative, which passes incoming requests from the client on to the server addressed, receives its acknowledgment, and transmits the acknowledgment to the client.

Figure 5A:
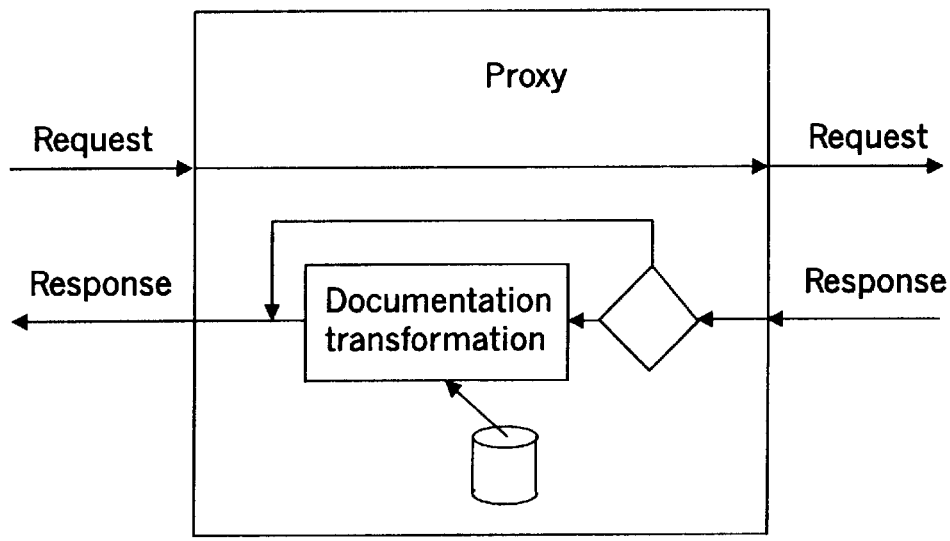
FIG. 5A shows a specific implementation of the present invention in the communications architecture according to FIG. 1.

FIG. 5A illustrates a special form of performance of the proxy in accordance with the present invention. The client transmits a request via the proxy to the server addressed. The server transmits the data requested to the proxy. The proxy checks the incoming data for the media type. If the examination reveals that documents referring to other documents are involved, for example HTML documents containing hyperlinks, the hyperlinks contained therein are expanded to include performance information are and transmitted to the client. The proxy is normally a server on which communications software containing the functionality described above is installed.

Figure 5B:
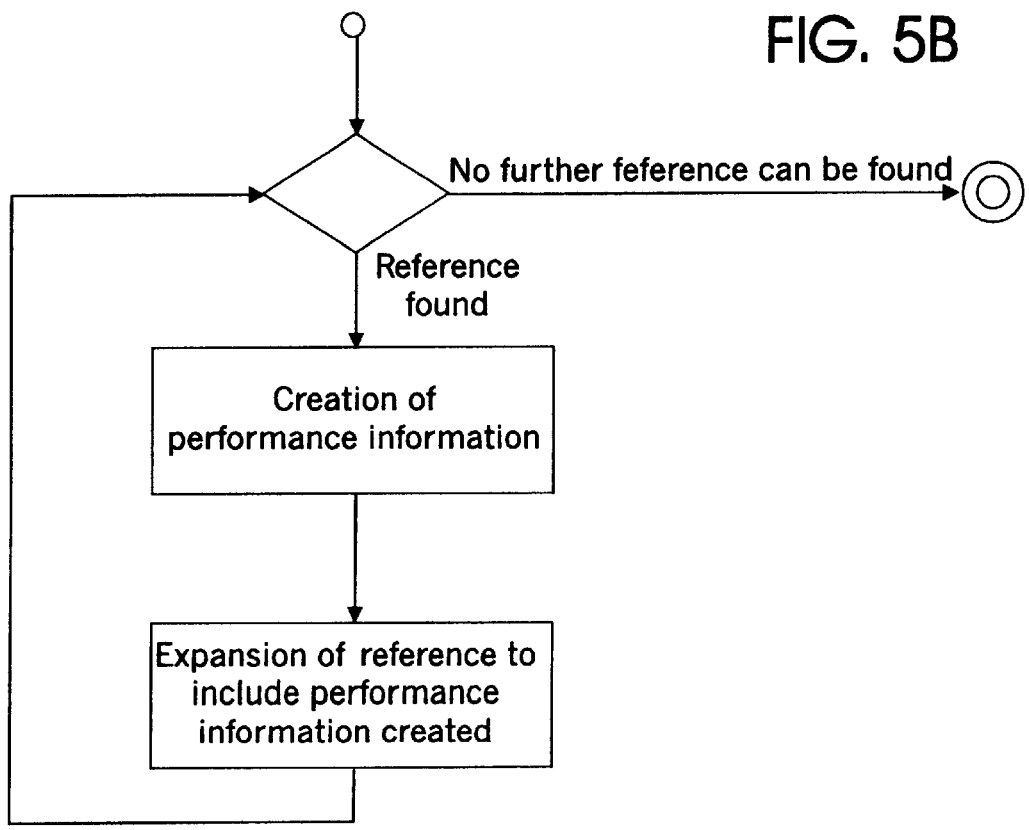
FIG. 5B shows the inventive document management system in the form of a flow chart.

FIG. 5B is a flow chart which illustrates the document transformation function, which expands the documents received to include the performance information. The document management function receives a document with hyperlinks. Further processing of the document takes place in the following steps:
1. Identification of a hyperlink which has not yet been processed;
2. Creation of the performance information for this hyperlink;
3. Addition of the performance information to the representation of the hyperlink;
4. Steps 1–3 are executed until all hyperlinks have been processed.

The creation of performance information as per step 2 can be realized by the following methods:
   Method according to the TCP/IP ping mechanism;
   Method of ascertaining empirical values, which are stored in a database; or
   Method according to the HTTP-HEAD request.

The TCP/IP ping method is based on a request being confirmed by a response of the server. The availability and response time of a server can be determined in this way.

In the method to ascertain empirical values, the transmission rates from previous accesses are stored in a table on the respective server.

The table can be implemented on a proxy, for example. A prognosis for the future transmission rate of the relevant server is ascertained from the transmission values. This method is particularly suitable for those user groups which go into the internet via a common proxy and often frequent certain servers on the internet.

In the case of the HTTP-HEAD request, document characteristics are requested. These characteristics are combined in conjunction with the empirical values in Method 2 to give a loading time to be expected.

The present invention describes a system and method for solving the problem of performance quality information not being available in the application environment of WWW applications such as web browsers, for example. It is based on the technical feasibility of expanding HTML documents belatedly to include performance information. The information can be expanded in a proxy, for example, which adds a loading speed or time to be expected to the documents to be passed on. However, functionality of this kind does not have to remain limited to this form of realization. Any addition of information of that kind (e.g. web browser) to an HTML document fulfils the fundamental idea of the invention report. Use of the invention by third parties is thus easily verifiable.

What is claimed is:

1. A method of transmitting and displaying files requested from an inquiring system (client) to a replying system (server) via a data network, wherein files of a defined format are stored on the server with references (hyperlinks) to other files, comprising the steps of:
   a) identifying files with references (hyperlinks) to other files;
   b) generating performance data for loading each of said files associated with said references; and c) integrating said performance data into a graphical display of said references prior to selection of one of said references.

2. The method in accordance with claim 1, characterized in that said performance data indicates a transmission speed per quantity of data for said each of said files with references to be loaded or the expected loading time for said each of said files.

3. The method in accordance with claim 2, characterized in that the hyperlinks are identified via their reference to other files.

4. The method in accordance with claim 3, characterized in that the hyperlinks in HTML language are identified via Anchor tags.

5. The method in accordance with claim 4, characterized in that the performance data are determined via a TCP/IP ping mechanism, in that the availability and response time of the server are determined from an inquiry by the client to the server and its response.

6. The method in accordance with claim 1, characterized in that the performance data are determined from transmission rates from previous accesses to the server, previous transmission values being filed in a table and a prognosis being established for a future transmission rate for the server concerned.

7. The method in accordance with claim 6, characterized in that an HTTP-head inquiry regarding characteristics of a referenced file is effected by the client and said expected loading time is determined from said file characteristics in combination with said previous transmission values.

8. The method in accordance with claim 7, characterized in that method steps a) to c) are part of a program which is installed in a client.

9. The method in accordance with claim 8, characterized in that method steps a) to c) are part of a browser.

10. The method in accordance with claim 9, characterized in that transmission of files from the server to the client is effected via the HTTP protocol.

11. The method in accordance with claim 10, characterized in that the files to be transmitted contain one or more hypertext documents.

12. The method in accordance with claim 11, characterized in that said performance data are only visible when a mouse pointer is placed on a hyperlink.

13. The method in accordance with claim 12, characterized in that the client is part of an intranet and the server is part of the internet and method steps a) to c) are executed by a program which is installed on a data processing system, which connects the intranet to the internet.

14. The method in accordance with claim 7, characterized in that method steps a) to c) are part of a program which is installed on a further data processing system, which is connected to the client and the server via a data line.

15. A document management system for transmitting documents from a server system, which can be used in an internet, to a client system, which can be used in an intranet, the documents being capable of being stored on the server system in a defined format with references (hyperlinks) to other documents, which can be stored on the same or other servers, characterized in that performance data for loading documents referenced by the hyperlinks are definable and the performance data can be integrated into a display of said hyperlinks prior to selection of one of said hyperlinks.

16. The document management system in accordance with claim 15, characterized in that the document management system can be installed on any client or on a data processing system which makes the intranet connectable to the internet.

17. The document management system in accordance with claim 16, characterized in that the document management system is part of a browser, which can be installed on the client system.

18. The document management system in accordance with claim 17, characterized in that the performance data are definable via a TCP/IP ping mechanism, an availability and response time of the server being definable from an inquiry of the client to the server and its response thereto.

19. The document management system in accordance with claim 17, characterized in that the performance data are definable from transmission rates from previous accesses to the server, a previous transmission value being storable in a table and from this a prognosis being ascertainable for a future transmission rate for the server concerned.

20. The document management system in accordance with claim 17, characterized in that the performance data can be interrogated by an HTTP-head inquiry by the client regarding file characteristics and a loading time to be expected is determinable from these file characteristics.

21. A computer program recorded on computer readable medium for transmitting and displaying files requested from an inquiring system (client) to a replying system (server) via a data network, wherein files of a defined format are stored on the server with references (hyperlinks) to other files, comprising:

a) computer readable means for identifying files with references (hyperlinks) to other files;

b) computer readable means for generating performance data for loading each of said files references; and c) computer readable means for integrating said performance data into a graphical display of said references prior to selection of one of said references.

* * * * *

UNITED STATES PATENT AND TRADEMARK OFFICE
CERTIFICATE OF CORRECTION

PATENT NO. : 6,892,219 B1
DATED : May 10, 2005
INVENTOR(S) : Lerenc et al.

It is certified that error appears in the above-identified patent and that said Letters Patent is hereby corrected as shown below:

Title page, Item [54] and Column 1, lines 1-4,
Title, delete "SYSTEM AND METHOD FOR ASCERTAINING AN DISPLAYING CONNECTION-RELATED PERFORMANCE DATA IN NETWORKS"
insert -- SYSTEM AND METHOD FOR ASCERTAINING AND DISPLAYING CONNECTION-RELATED PERFORMANCE DATA IN NETWORKS --.

Column 1,
Line 28, after "options" delete "exit" and insert -- exist --.
Line 30, after "However" insert -- , --.
Line 53, after "present" insert -- invention --.

Column 4,
Line 4, after "information" delete "are and" and insert -- and are --.
Line 19, after "hyperlink;" insert -- and --.
Line 37, after "method is" delete "particularly".

Column 5,
Line 10, after "via their" delete "reference" and insert -- references --.

Column 6,
Line 21, after "client" delete "system." and insert -- systems. --.
Line 38, after "program" insert -- product --.
Line 47, after "files" insert -- with --.

Signed and Sealed this

Twenty-fourth Day of January, 2006

JON W. DUDAS
*Director of the United States Patent and Trademark Office*